Nov. 4, 1952     C. H. O. BERG     2,616,829
ABSORPTION PROCESS AND APPARATUS
Filed Dec. 27, 1948
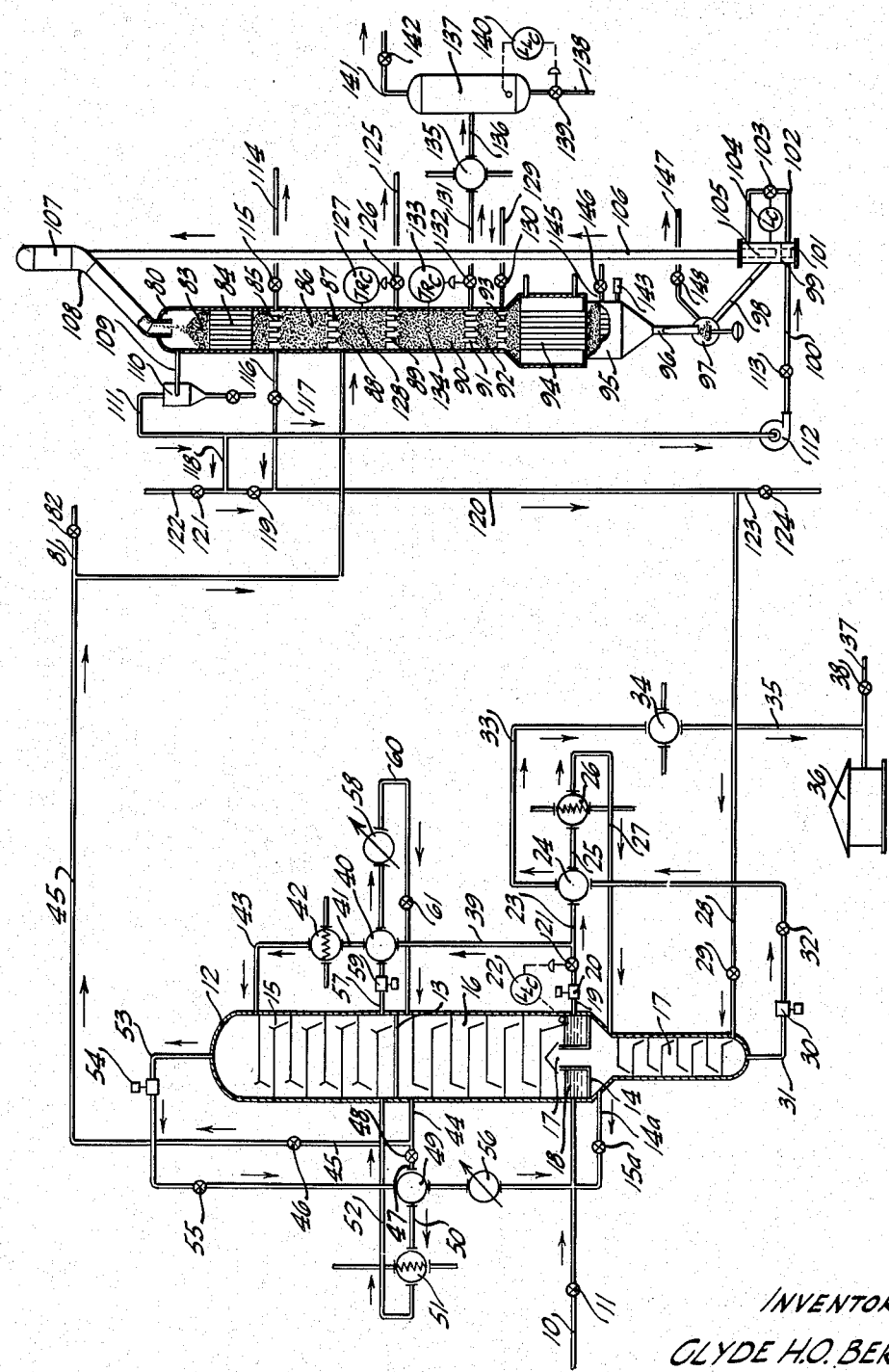
INVENTOR.
CLYDE H.O. BERG,
BY Ross J. Garofalo
ATTORNEY.

Patented Nov. 4, 1952

2,616,829

UNITED STATES PATENT OFFICE 2,616,829

ABSORPTION PROCESS AND APPARATUS

Clyde H. O. Berg, Long Beach, Calif., assignor to Union Oil Company of California, Los Angeles, Calif., a corporation of California Application December 27, 1948, Serial No. 67,394

20 Claims. (Cl. 196—8)

This invention relates to a method and apparatus for the separation of gaseous mixtures and in particular relates to the treatment of gaseous mixtures which contain normally liquid components as vapors such as for example a mixture of hydrocarbon gases.

Such gaseous mixtures may be separated in a variety of conventional ways to recover the normally liquid components thereof such as by cooling and partially condensing these components, by absorbing these components in a suitable solvent and separating the undissolved gas, condensing the entire gaseous mixture and distilling the condensate to obtain separate fractions thereof and other well known methods. In certain particular instances, each of the aforementioned methods may be employed to certain advantage over the others depending upon the nature of the gaseous mixture to be separated, the source of the gaseous mixture, the physical condition of the mixture with regard to pressure and temperature, and of course, economic factors.

In the treatment of liquid hydrocarbons including catalytic and thermal cracking processes and the like, large quantities of gaseous mixtures are produced which contain considerable proportions of normally gaseous hydrocarbon fractions. These gases are characterized by the fact that they contain unsaturated or olefinic hydrocarbon compounds which are highly reactive chemically and well suited to the production of synthetic organic compounds as well as other uses. The separation of such chemically reactive compounds from gaseous mixtures may be effected by the conventional processes when a considerable loss of the reactive compounds may be tolerated. However, when it is desired to effect a substantially complete and economic recovery of normally liquid highly reactive compounds in their vapor state from other gases, special precautions need to be exercised to effect the desired recovery.

It is therefore a primary object of the present invention to provide a method especially adapted to the highly efficient and economic recovery for the separation of normally liquid constitutents from admixture with other gases.

A further object of the present invention is to provide an improved method whereby normally liquid constituents of high chemical activity may be recovered from gaseous mixtures without damage or loss efficiently and economically.

A more particular object of this invention is to provide a continuous process for the recovery of olefinic and unsaturated hydrocarbon constituents which are normally liquid from gaseous mixtures containing the same.

A specific object of this invention is to provide an improved combination process for the separation of valuable normally liquid hydrocarbon constituents of gaseous mixtures which involves a preliminary pretreatment of the gaseous mixture with a liquid phase comprising condensed normally liquid hydrocarbons, and which pretreatment co-functions with a continuous selective adsorption operation in which the normally gaseous fraction is separated into a plurality of streams, one of which assists the pretreatment step.

Another object of this invention is to provide a particular type of apparatus wherein the foregoing objects may be realized.

Other objects and advantages of the present invention will become apparent to those skilled in the art as the description and illustrations thereof proceed.

Briefly, the present invention comprises in its preferred embodiment the introduction of a gaseous mixture containing constituents of wide molecular weight range including constituents which are normally liquid into a pretreatment section or zone wherein the gaseous mixture is contacted with a liquid phase comprising condensed normally liquid constituents present in the gaseous mixture. The enriched liquid phase thus formed is subsequently warmed to a superatmospheric temperature below the boiling point and normally gaseous constituents are stripped out in the absence of absorption oils and high temperature surfaces. The peculiar mode of operation of the pretreatment section as hereinafter completely described permits the separation of the normally liquid constituents present in the gaseous mixture from the normally gaseous constituents. Part of the normally liquid constituents thus recovered are employed to contact further quantities of the gaseous mixture to be treated while the rest are separated as a liquid product. The normally gaseous constituents are further treated with normally liquid constituents to produce a dry gas from the pretreatment section which is substantially free of normally liquid constituents. The dry gas is then contacted with a moving bed of solid granular adsorbent in a selective adsorption section whereby several substantially pure fractions of the dry gas are produced. One of these fractions is returned to the pretreatment step to aid in the refining of the normally liquid constituents produced as a product from that step.

The process of the present invention may be applied with the realization of the greatest advantage to a gaseous mixture containing normally liquid constituents which are chemically active or thermally sensitive such as a gaseous mixture of hydrocarbons obtained from a high temperature petroleum refining operation. Such a gas contains unsaturated and olefinic hydrocarbons which readily polymerize at temperatures above about 250° F. and consequently may not be distilled from a condensed mixture thereof or may not be stripped from an adsorption oil solution thereof without undue polymerization losses resulting. The present process employs no absorption oil with attendant high temperature stripping problems. No reboiling of the recovered hydrocarbon liquid is utilized in the process of the present invention. It has been found that there results considerable improvement in the efficiency of separation of the type of gaseous mixtures given above and the complete freedom of undue product losses, absorption oil purification problem since elevated temperatures normally employed in conventional processes are not required in the present process, and of hydrates nearly always encountered when hydrocarbon gases are treated at high pressure and refrigeration temperatures in the presence of water vapor.

The following complete description of the process of this invention is conducted in conjunction with the accompanying drawing in which a flow diagram of the process is shown employing a pretreatment operation and a selective adsorption operation in the continuous separation of a gaseous mixture containing normally liquid constituents. For purposes of illustration, the gaseous mixture will be considered to be a wet cracked gas produced in high temperature refining operations and containing constituents of wide molecular weight range varying from hydrogen to hydrocarbon constituents having as high as ten carbon atoms per molecule. It should be understood, however, that the process is not limited to the treatment of only cracked gases since it may be employed in the treatment of wet natural gas produced with crude petroleum and which contains natural gasoline as the normally liquid components. The process is further not limited merely to the treatment of hydrocarbon gases since it may be applied also to the recovery of chemically active solvent vapors from gases and the like.

The description of the drawing will be conducted as a specific example of the operation of the process in which the gaseous mixture having the composition given in Table 1 will be separated into stabilized liquid pretreater bottoms product and a series of three gaseous products from the selective adsorption column.

TABLE 1

*Feed gas analysis*

| Component: | Mol per cent |
|---|---|
| $H_2$ | 9.46 |
| $CH_4$ | 23.76 |
| $C_2H_2$ | 0.10 |
| $C_2H_4$ | 22.21 |
| $C_2H_6$ | 7.35 |
| $C_3H_6$ | 12.71 |
| $C_3H_8$ | 1.20 |
| $C_4H_6$ | 2.51 |
| $C_4H_8$ | 4.40 |
| $C_4H_{10}$ | 0.14 |
| $C_5$'s | 3.26 |
| $C_6$—400° F. | 12.90 |
| | 100.00 |

The process of the present invention is applied to the above described gaseous mixture to separate the $C_4$ and higher molecular weight hydrocarbons, to be produced as the liquid product, from a dry gas containing the $C_3$ and lower molecular weight hydrocarbons and which is subsequently separated into three fractions of substantial purity in the selective adsorption operation. The overhead or lean gas product from the selective adsorption operation contains hydrogen and methane, the side cut gas product comprises a $C_2$ hydrocarbon heart cut of the dry gas while the bottoms fraction or rich gas product contains the $C_3$ hydrocarbons.

The feed gas mixture is introduced by means of line 10 at a rate controlled by valve 11 into pretreater column 12 at a rate of 1473 pound mols per hour. The pretreater column 12 is divided into three sections by means of upper divider 13 and lower divider 14. Lower divider is shown in the drawing with opening 17, however, it may be substituted with a closed divider like upper divider 13 and the gas from zone 17 may be conducted via line 14a controlled by valve 15a to the feed stream or directly into zone 16. The column is therefore provided with primary stripping zone 15, feed gas absorption zone 16 and liquid product stripping zone 17. The construction of this particular column is one in which bubble cap trays are employed, although other types of trays or packing may be substituted.

The feed gas passes upwardly through absorption zone 16 in countercurrent contact to a downwardly flowing liquid stream of hydrocarbons separated from the feed gas previously as a scrubbing agent or solvent and by means of which a substantial proportion of the normally liquid hydrocarbons of the feed gas and the $C_4$ hydrocarbons are dissolved. The temperature at which the contact in absorption zone 16 is effected is preferably less than about 125° F., a typical operational temperature being an atmospheric temperature in the range of 80° F. to 100° F. Additional coolers, not shown, may be incorporated in absorption zone 16 to dissipate the heat of absorption. The enriched solvent collects in the bottom of absorption zone 16 above lower divider 14 which is provided with riser 17 by means of which the gases pass directly from product stripping zone 17 upwardly into absorption zone 16. The down flowing rich solvent forms accumulation 18 on lower divider 14 from which it is withdrawn via line 19 under the influence of pump 20 at a rate controlled by valve 21 which in turn is actuated by liquid level controller 22. This liquid comprises liquefied $C_4$, $C_5$ and $C_6$ to 400° F. hydrocarbons saturated with lower boiling hydrocarbons of the feed gas mixture, mostly $C_2$ and $C_3$ hydrocarbons.

A portion of this liquid so withdrawn from lower divider 14 passes via line 23 through exchanger 24 wherein it is warmed to a temperature of about 180° F. in exchange with the bottoms product from liquid product stripper 17. The interchanged liquid subsequently passes via line 25 through heater 26 in which the temperature is raised to between 200° F. and 250° F. depending upon the nature of the unsaturated hydrocarbons present in the liquid so that the temperature for polymerization and similar reactions is not exceeded. The preheated liquid then passes via line 27 on to the upper tray of product stripper 17, the liquid passes downwardly therethrough countercurrent to a rising stream of lean gas consisting mainly of hydrogen and methane from the selective adsorption column which is introduced by means of line 28 at a rate of about 260 pound mols per hour controlled by valve 29. Separate heaters, not shown, may be incorporated in product stripper 17 to replace heat losses. The analysis of this gaseous mixture is given subsequently in Table 4. The rising gases strip from the down flowing liquid substantially all of the $C_3$ and lighter hydrocarbons and hydrogen so that the bottoms product removed from the lower outlet of product stripper 17 comprises the $C_4$, $C_5$ and $C_6$ to 400° F. hydrocarbons saturated with hydrogen and methane at a temperature of about 250° F. This product is pumped by pump 30 via line 31 at a rate controlled by valve 32 and is introduced into exchanger 24 wherein the temperature of the liquid product is lowered to about 130° F. The partially cooled liquid product passes via line 33 through product cooler 34 wherein the temperature is decreased to well below 100° F. suitable for storage. The cooled liquid product then passes via line 35 at a rate of about 320 pound mols per hour into liquid product storage tank 36 or it may be conducted via line 37 controlled by valve 38 to further processing facilities not shown. The composition of the liquid product thus obtained is given in Table 2.

TABLE 2

*Liquid product analysis*

| Component: | Mol percent |
|---|---|
| $C_3H_6$ | 0.3 |
| $C_3H_8$ | 0.1 |
| $C_4H_6$ | 10.4 |
| $C_4H_8$ | 18.2 |
| $C_4H_{10}$ | 0.6 |
| $C_5$'s | 12.8 |
| $C_6$ to 400° F. | 57.6 |
| | 100.0 |

The product thus obtained contains a relatively high percentage of highly reactive unsaturated hydrocarbons including butadiene, various butylenes, and unsaturated heavier hydrocarbons including pentenes, cyclopentadiene and the like. The success with which the pretreatment operation produces this liquid product without substantial loss of the valuable unsaturated constituents may be attributed to the absence of a higher molecular weight solvent other than the constituents present in the feed gas mixture, the absence of a redistillation stage in which the liquid product must be reboiled and rectified, and the general use of moderate temperatures in all parts of the apparatus permitted by the heat interchange system and the above described liquid product stripping procedure.

The remaining portion of the liquid withdrawn from accumulation 18 on lower divider 14 is pumped via line 39 through exchanger 40 in which the temperature of the liquid is increased from between about 80° F. and 100° F. to about 178° F. The partially preheated liquid subsequently passes via line 41 through heater 42 in which the liquid is heated to a temperature between 200° F. and 250° F. and below the polymerization temperature and is then passed via line 43 to the upper tray of primary stripper 15 to flow downwardly over the trays or packing. The undissolved gases collecting in the upper portion of absorption section 16 comprise the $C_3$ and lighter hydrocarbons saturated with constituents of the liquid fraction at atmospheric temperature. These gases are removed via line 44 and a portion thereof passes via line 45 controlled by valve 46 to the selective adsorption section while the remainder passes via line 47 controlled by valve 48 into interchanger 49. Herein the temperature is increased to 200° F. and further heated to the temperature of liquid in primary stripper 15 by passage through line 50 and heater 51. The preheated gases subsequently are introduced via line 52 into the lower portion of primary stripper 15 to contact the down flowing liquid. Within primary stripper 15 the upwardly flowing gases remove the lower molecular weight normally gaseous hydrocarbons dissolved in the down flowing liquid producing an overhead recycle gas comprising these desorbed lower molecular weight hydrocarbons saturated with liquid hydrocarbon at the temperature of the primary stripper. Heat losses may be counteracted by using internal heaters, not shown, within stripper 15. This gas is removed from the top of primary stripper 15 via line 53 and passed by means of blower 54 at a rate controlled by valve 55 to be combined with the feed gas introduced into absorber 16 after passing through interchanger 49 and recycle gas cooler 56.

The liquid removed from the bottom of primary stripper 15 is substantially free of lower boiling hydrocarbons and comprises essentially the $C_5$ and $C_6$ to 400° F. hydrocarbons. This stream is removed from an accumulation above upper divider 13 by means of line 57 and is pumped through interchanger 40 and cooler 58 by means of pump 59. The cooled liquid then becomes the solvent for the combined feed gas and primary stripper recycle gas and passes via line 60 controlled by valve 61 onto the uppermost tray of absorber 16. It flows downwardly through absorber 16 as above described to dissolve the $C_4$ and heavier molecular weight fraction from the gas and is ultimately produced as the liquid product.

The $C_3$ and lower molecular weight hydrocarbons together with hydrogen separated from the liquid product in the pretreater section are removed from the upper portion of absorber 16 by means of line 45 controlled by valve 46 as the pretreater dry gas and is introduced by means of line 45 into selective adsorption column 80 as a feed gas. This gas also contains the gases removed from the top of product stripper 17. If desired, a portion of this dry gas may be produced without further treatment via line 81 controlled by valve 82 from the system. This gas has the following composition:

TABLE 3

*Pretreater dry gas or selective adsorber feed gas*

| Component: | Mol percent |
|---|---|
| $H_2$ | 15.1 |
| $CH_4$ | 37.8 |
| $C_2H_2$ | 0.1 |
| $C_2H_4$ | 23.2 |
| $C_2H_6$ | 7.7 |
| $C_3H_6$ | 13.2 |
| $C_3H_8$ | 1.2 |
| $C_4H_6$ | 0.3 |
| $C_4H_8$ | 0.5 |
| $C_4H_{10}$ | 0.0 |
| $C_5$'s | 0.5 |
| $C_6$—400° F. | 0.4 |
| | 100.0 |

This gas is introduced into selective adsorption column 80 at a temperature of about 80° F. to 100° F. at a rate of 1410 pound mols per hour when the entire pretreatment section dry gas is to be separated.

The selective adsorptive column is provided with hopper 83, cooling zone 84, overhead gas or lean gas disengaging zone 85, adsorption zone 86, feed gas engaging zone 87, primary rectification zone 88, side cut disengaging zone 89, secondary rectification zone 90, rich gas or bottoms product disengaging zone 91, steaming zone 92, stripping gas engaging zone 93, heating zone 94, adsorbent feeder zone 95 and sealing leg 96. The solid granular adsorbent, which in the preferred modification is activated vegetable charcoal, is passed downwardly by gravity through the aforementioned zones in the form of a dense compact moving bed and passes from the bottom of the column via sealing leg 96 through adsorbent flow control valve 97 and transfer line 98 into induction zone 99. A lift gas is introduced via line 100 into induction zone 99 to form an adsorbent-lift gas suspension therein. The rate at which the suspension is formed is controlled by varying the quantity of lift gas passing from lift gas inlet zone 101 via line 102 controlled by valve 103 which in turn is actuated by level controller 104 and introduced into solids inlet zone 105 in the upper portion of the induction zone. The lift gas suspension thus formed passes upwardly through lift line 106 into impactless separator 107 wherein the suspension is broken. The separated lift gas containing elutriated adsorbent fines suspended therein and the separated adsorbent pass as substantially independent phases by through transfer line 108 into adsorbent hopper 83. The lift gas and fines pass via line 109 into centrifugal separator 110 in which the suspended fines are separated. The fines-free lift gas subsequently passes via line 111 into suction inlet of gas blower 112 which reintroduces the lift gas via line 100 at a rate controlled by valve 113 into induction zone 99. Thus a continuously recirculated stream of adsorbent is maintained as a moving bed through the column. In the preferred modification, the adsorbent employed is activated coconut charcoal in which case the adsorbent circulation rate is about 175,000 pounds per hour.

The feed gas mixture is introduced as above described into feed gas engaging zone 87 wherefrom it passes upwardly through adsorption zone 86 in countercurrent contact to a downward flow of adsorbent. The adsorbent to feed gas ratio is such that the $C_3$ and $C_2$ hydrocarbons are preferentially adsorbed together with a small proportion of lighter constituents to form a rich adsorbent while the methane and hydrogen together with a small amount of $C_2$ hydrocarbons remain substantially unadsorbed. The unadsorbed gases pass to the top of adsorption zone 86 from which a portion is removed as an overhead or lean gas product via line 114 controlled by valve 115 and sent to production or further processing facilities not shown. Another portion of this lean gas product may be removed from zone 85 via line 116 controlled by valve 117 together with a portion of lift gas if desired passing through line 118 controlled by valve 119 may be recirculated through lines 120 and 28 to be introduced into the bottom of product stripper 17 in the pretreatment section. If desired, the bleed gas removed from the lift gas return line 111 may be removed via line 121 controlled by valve 122 and sent to production or other uses not shown. A portion of the substantially unadsorbed gases passes upwardly through the tubes of cooling zone 84 in countercurrent contact with the adsorbent therein to presaturate the adsorbent with lean gas product constituents and to desorb traces of adsorbed stripping gas thereby directly cooling the adsorbent. This gas stream is called the purge gas and contains about 55% to 60% hydrogen and 40% to 45% methane, approximately the composition of the lift gas, and may be used as the stripping gas in product stripper 17. It combines with the recirculating lift gas stream in the top of column 80.

The lean gas or adsorber overhead product is removed from the system at a rate of 490 pound mols per hour and has the composition given in Table 4.

TABLE 4

*Lean gas analysis*

| Component: | Mol percent |
|---|---|
| $H_2$ | 28.5 |
| $CH_4$ | 71.0 |
| $C_2H_4$ | 0.5 |
| Total | 100.0 |

The rich adsorbent subsequently passes from adsorption zone 86 into primary rectification zone 88 wherein it is contacted with a countercurrent flow of a side cut gas reflux containing $C_2$ and $C_3$ hydrocarbon gases. Small amounts of absorbed hydrogen and methane are preferentially desorbed from the rich adsorbent to join the lean gas product leaving a rectified adsorbent principally containing adsorbed $C_2$ and $C_3$ hydrocarbons. The rectified adsorbent then passes into secondary rectification zone 90 wherein it is contacted with a countercurrent flow of rich gas reflux containing $C_3$ hydrocarbons thereby preferentially desorbing the $C_2$ hydrocarbons which collect in side cut gas disengaging zone 89. A portion of this gas is employed as reflux in primary rectification zone 88 and the remainder is removed as a side cut gas product via line 125 at a rate of 437 pound mols per hour controlled by valve 126. Temperature recorder controller 127 operates in conjunction with thermocouple point 128 positioned in direct contact with the adsorbent in primary rectification zone 88 to vary valve 126. The side cut gas product has the composition given in Table 5.

TABLE 5

*Side cut product gas analysis*

| Component: | Mol per cent |
|---|---|
| $CH_4$ | 0.1 |
| $C_2H_4$ | 75.1 |
| $C_2H_6$ | 24.2 |
| $C_3$'s | 0.6 |
| | 100.0 |

The rectified adsorbent passes into preferential desorption zone 92 wherein it is contacted with a countercurrent flow of stripping gas introduced via line 129 controlled by valve 130 into stripping gas engaging zone 93. The adsorbed $C_3$ hydrocarbons are preferentially desorbed as a rich gas, a portion of which is employed as the $C_3$ reflux gas in secondary rectification zone 90 and the remaining portion of which is passed via line 131 at a rate of 203 pound mols per hour controlled by valve 132 which in turn is actuated by temperature recorder controller 133 operating in conjunction with thermocouple point 134 contacting the adsorbent in secondary rectification zone 90. The desorbed $C_3$ hydrocarbons, together with some stripping gas, are introduced into rich gas cooler 135 and the cooled mixture resulting is passed via line 136 into separator 137. The preferred stripping gas comprises steam and the condensed water is removed from the lower portion of separator 137 via line 138 controlled by valve 139 and liquid level controller 140. A rich gas product is removed by means of line 141 controlled by valve 142 and has the composition given in Table 6.

TABLE 6

*Rich gas product analysis*

| Component: | Mol per cent |
| --- | --- |
| $C_2H_6$ | 0.1 |
| $C_3H_6$ | 91.0 |
| $C_3H_8$ | 8.5 |
| $C_4H_6+$ | 0.5 |
| | 100.0 |

The partially stripped adsorbent passes then through the tubes of heating zone 94 wherein the adsorbent is indirectly heated and contacted countercurrently with further quantities of stripping gas whereby remaining portions of adsorbed rich gas constituents are desorbed. In one modification this heated adsorbent is concurrently contacted with a stream of stripping gas which is removed below heating zone 95 via line 145, controlled by valve 146 and it may be combined if desired with the rich gas product or combined and recirculated with stripping gas introduced into stripping gas engaging zone 93.

The adsorbent removed from heating zone 94 is at a temperature of about 450° F. and is saturated with adsorbed stripping gas. The adsorbent passes at a controlled flow rate through adsorbent feeder zone 95 and subsequently downward through sealing leg 96 through adsorbent flow control valve 97 which is employed to maintain sealing leg 96 full of dense phase adsorbent.

A portion of the recirculated stripping gas passes downwardly through sealing leg 96 and a portion of the lift gas passes upwardly through transfer line 98 since this transfer line is not generally maintained full of adsorbent but the adsorbent flows along the lower surface into induction zone 99. To prevent the lift gas from entering the lower part of the adsorption column and to prevent undue accumulations of stripping gas from entering the lift gas recirculation system, a seal gas comprising stripping and lift gas is removed from the chamber of charcoal flow control valve 97 via line 147 at a rate controlled by valve 148. This gas is discarded or sent to fuel, or combined with the lean gas product if desired. The adsorbent is recirculated then as above described to the upper portion of selective adsorption column 80 to pass through cooler 84 wherein it is cooled to 100° F. prior to contacting further quantities of the gaseous mixture.

Operation of the process of the present invention in connection with typical wet cracked gases, as described in the foregoing example and illustrated in the drawing, has been found to decrease markedly the utilities requirement for the separation and achieve an outstanding reduction in the quantity of unsaturated and chemically reactive normally liquid constituents lost when such gaseous mixtures are treated in conventional absorption oil or distillation processes. In the apparatus of the present invention there is a complete absence of heat transfer surfaces which ordinarily of necessity must be maintained at temperatures well above the temperatures to which the stream in the conventional absorption and distillation processes must be heated. It has been found that the presence of these surfaces rapidly degrade absorption oil when used due to the rapid polymerization of unsaturated hydrocarbon constituents. The usual fouling of heat transfer surfaces by these polymerizable constituents usually encountered in distillation processes where the liquid product is distilled and produced as an overhead product is eliminated. The use of a light gas which, under conditions of contact is only slightly absorbable in the liquid product as a stripping gas, markedly assists in the production of high quality unsaturated liquid products at a substantially increased yield over that usually found in conventional treatments. The selective adsorption process and the herein described improved pretreatment process cooperate with one another in the manner described above to permit the efficient and easily controlled separation of typically wet cracked gases into desirable constituents in condition for synthetic chemicals manufacture or for conversion into internal combustion engine fuels of high quality.

Adsorbents other than activated charcoal may be employed if desired including silica gel, aluminum oxide, iron oxide, and other well known solid granular adsorbents. Preferably, the mesh size of granular adsorbent is from 10 to 30 mesh, although particles as large as 2 mesh to as small as 100 mesh may be employed.

As above stated the principles of the present process are obviously applicable to gaseous mixtures containing condensable constituents other than those employed to facilitate description thereof and that the scope of the present invention is to be limited only by the following claims.

I claim:

1. A process for the separation of thermally sensitive normally liquid hydrocarbon constituents from a gaseous mixture thereof which comprises countercurrently contacting said gaseous mixture in an absorption zone with a condensed stream of said normally liquid constituents recovered from said gaseous mixture forming an enriched condensate and leaving normally gaseous constituents in the gas phase, heating one portion of said enriched condensate to a superatmospheric temperature less than 250° F., heating one portion of said normally gaseous constituents to approximately the same temperature, countercurrently contacting a portion of the heated gas and a portion of the heated liquid in a primary stripping zone forming a stripped condensate free of normally gaseous constituents and a stripped gas saturated with normally liquid constituents, cooling said stripped gas, combining said stripped gas with said gaseous mixture to be separated, cooling said stripped condensate to atmospheric temperature, contacting the cool stripped condensate with further quantities of said gaseous mixture, contacting the remaining portion of the normally gaseous constituents produced in said absorption zone with a moving bed of solid granular adsorbent thereby adsorbing the higher molecular weight constituents thereof leaving the lower molecular weight constituents substantially unadsorbed, employing a portion of the substantially unadsorbed gases thus obtained to contact the remaining portion of said enriched condensate in a liquid product stripping zone thereby stripping normally gaseous constituents therefrom, passing the stripping gas and normally gaseous constituents stripped from said liquid product into said absorption zone and removing the thermally sensitive normally liquid hydrocarbon constituents substantially free of normally gaseous hydrocarbon constituents from said liquid product stripping zone.

2. A process according to claim 1 wherein said granular adsorbent comprises activated charcoal.

3. A process for the separation of higher molecular weight hydrocarbons from admixture with lower molecular weight hydrocarbons in gaseous mixtures thereof which comprises contacting said gaseous mixture with a stream of condensed higher molecular weight hydrocarbons in an absorption zone forming an enriched hydrocarbon liquid fraction and a depleted gaseous hydrocarbon fraction, heating a first portion of said enriched liquid fraction, heating one portion of said depleted gaseous fraction to substantially the same temperature as the first portion of said enriched liquid fraction, contacting the two heated streams countercurrently in a primary stripping zone to form a liquid fraction substantially free of said lower molecular weight hydrocarbons and a gaseous fraction saturated with said higher molecular weight hydrocarbons, cooling said gaseous fraction saturated with normally liquid hydrocarbons, combining said gaseous fraction with said gaseous mixture to be separated, cooling said last-named liquid fraction produced in said primary stripping zone, contacting the thus cooled liquid fraction with further quantities of said gaseous mixture in said absorption zone, removing the remaining portion of said depleted gaseous fraction from said absorption zone, introducing the remaining portion of said enriched liquid fraction produced in said absorption zone into a liquid product stripping zone, countercurrently contacting said remaining portion with a portion of said depleted gaseous fraction thereby stripping low molecular weight hydrocarbons from said liquid and producing the stripped hydrocarbon liquid as a liquid product from said liquid product stripping zone substantially free from absorbed low molecular weight normally gaseous hydrocarbons.

4. A process according to claim 3 wherein said hydrocarbon gas mixture to be separated comprises a wet cracked hydrocarbon gas containing hydrogen and hydrocarbon constituents of wide molecular weight range, said liquid product comprises the $C_4$ and higher molecular weight hydrocarbons separated therefrom, the $C_3$ and lower molecular weight hydrocarbons and hydrogen being separated from said enriched hydrocarbon liquid obtained in said absorption zone by contacting said enriched hydrocarbon liquid in said liquid product stripping zone at a superatmospheric temperature below about 250° F. with a low molecular weight stripping gas in the absence of indirect heating to produce said liquid product.

5. A process according to claim 3 wherein said first portion of enriched hydrocarbon liquid is heated by indirect heat exchange with the stripped hydrocarbon liquid removed from said primary stripping zone, said depleted gaseous hydrocarbon fraction is heated by indirect heat exchange with the gaseous hydrocarbon fraction saturated with normally liquid hydrocarbons removed from said primary stripping zone and said stripped hydrocarbon liquid product is cooled by indirect heat exchange with said second fraction of enriched hydrocarbon liquid removed from said absorption zone.

6. A process according to claim 3 wherein said portion of said depleted gaseous hydrocarbon fraction employed to strip said liquid hydrocarbon product in said product stripping zone is obtained by the steps of contacting a part of said depleted gaseous hydrocarbon fraction removed from said absorption zone with a moving bed of solid granular adsorbent whereby the higher molecular weight hydrocarbon gases of said depleted gaseous fraction are adsorbed leaving the lower molecular weight hydrocarbon gases substantially unadsorbed and introducing a portion of said substantially unadsorbed gas into said liquid hydrocarbon product stripping zone.

7. A process for the separation of normally liquid hydrocarbon constituents from a gaseous mixture thereof with normally gaseous hydrocarbon constituents which comprises countercurrently contacting said gaseous mixture in an absorption zone with a condensed stream of said normally liquid constituents recovered from said gaseous mixture forming an enriched condensate and leaving normally gaseous constituents in the gas phase, heating one portion of said enriched condensate, heating one portion of said normally gaseous constituents to approximately the same temperature, countercurrently contacting the heated gas with a portion of the heated liquid in a primary stripping zone forming a stripped condensate free of normally gaseous constituents and a stripped gas saturated with normally liquid constituents, cooling said stripped gas, combining said stripped gas with said gaseous mixture to be separated, cooling said stripped condensate, contacting the cool stripped condensate with further quantities of said gaseous mixture, contacting the remaining portion of the normally gaseous constituents produced in said absorption zone with a moving bed of solid granular adsorbent thereby adsorbing the higher molecular weight constituents thereof leaving the lower molecular weight constituents substantially unadsorbed, employing a portion of the substantially unadsorbed gases thus obtained to contact the remaining portion of said enriched condensate in a liquid product stripping zone thereby stripping normally gaseous constituents therefrom, passing the stripping gas and normally gaseous constituents stripped from said liquid product into said absorption zone and removing the normally liquid hydrocarbon constituents substantially free of normally gaseous hydrocarbon constituents from said liquid product stripping zone.

8. A process for the separation of normally liquid hydrocarbon constituents from a gaseous mixture thereof with normally gaseous hydrocarbon constituents which comprises countercurrently contacting said gaseous mixture in an absorption zone with a condensed stream of said normally liquid constituents recovered from said gaseous mixture forming an enriched condensate and leaving normally gaseous constituents in the gas phase, heating one portion of said enriched condensate, heating one portion of said normally gaseous constituents to approximately the same temperature, countercurrently contacting the heated gas with a portion of the heated liquid in a primary stripping zone forming a stripped condensate free of normally gaseous constituents and a stripped gas saturated with normally liquid constituents, cooling said stripped gas, combining said stripped gas with said gaseous mixture to be separated, cooling said stripped condensate, contacting the cool stripped condensate with further quantities of said gaseous mixture, contacting the remaining portion of the normally gaseous constituents produced in said absorption zone with a moving bed of solid granular adsorbent to adsorb the higher molecular weight hydrocarbon gases forming a rich adsorbent leaving hydrogen and methane as a substantially unadsorbed lean gas, removing said hydrogen and methane as a lean gas product from said selective adsorption zone, subsequently contacting said rich adsorbent with a reflux gas containing $C_3$ hydrocarbons thereby desorbing $C_2$ hydrocarbons as a side cut gas product substantially free of $C_1$ and $C_3$ hydrocarbons leaving a rectified adsorbent, subsequently desorbing adsorbed $C_3$ hydrocarbons as a rich gas product from said rectified adsorbent leaving a lean adsorbent, recirculating said lean adsorbent to contact further quantities of said normally gaseous hydrocarbon constituents, employing a portion of said substantially unadsorbed lean gas to contact the remaining portion of said enriched hydrocarbon condensate in a liquid hydrocarbon stripping zone thereby stripping normally gaseous hydrocarbons therefrom, passing the stripping gas and normally gaseous constituents stripped from said liquid product into said absorption zone and removing the normally liquid hydrocarbon constituents substantially free of normally gaseous hydrocarbon constituents from said liquid product stripping zone.

9. An apparatus for separating a gaseous mixture which comprises a vertical cylindrical absorption column, contact material within said column for increasing the surface area for the contact of gases and liquids, a pair of spaced lateral dividers within said column forming a primary stripper section in the upper portion of said column above the upper lateral divider, an absorption section between said dividers and a product stripper section below the lower divider, an inlet conduit for said gaseous mixture into the bottom of said absorption section, a conduit for liquid communicating the bottom of said absorption section with the top of said primary stripper section, a conduit for liquid communicating the bottom of said absorption section with the top of said product stripper section, a conduit for gas communicating the top of said absorption section with the bottom of said primary stripper section, a conduit for liquid communicating the bottom of said primary stripper section with the top of said absorption section, a conduit for gas communicating the top of said primary stripper section with the bottom of said absorption section, an outlet conduit for gas from the top of said absorption section, an inlet conduit entering the bottom of said product stripper section, a conduit for gas communicating the top of said product stripper section with the bottom of said absorption section and an outlet conduit from the bottom of said product stripper section.

10. An apparatus according to claim 9 in combination with a vertical selective adsorption column, means for circulating a stream of solid granular adsorbent through said adsorption column, a conduit communicating the top of said absorption section with the central portion of said selective adsorption column, and a conduit communicating the upper portion of said selective adsorption column with said inlet conduit into the bottom of said product stripper section.

11. An apparatus according to claim 10 in combination with an external indirect heater in the conduit for liquid communicating the bottom of said absorption section with the top of said product stripper section, an external indirect heater in said conduit for gas communicating the top of said absorption section with the bottom of said primary stripper section, an external indirect heater in said conduit communicating the bottom of said absorption section with the top of said primary stripper section, and external indirect cooler in said conduit for liquid communicating the bottom of said primary stripper section with the top of said absorption section, and an external indirect cooler in said conduit for gas communicating the top of said primary stripper section with the bottom of said absorption section.

12. An apparatus according to claim 11 wherein said lower lateral divider is provided with a central vertical cylindrical riser open at its upper and lower ends and extending upwardly from said riser and forming an annular space between said riser and the wall of said column at the bottom of said absorption section to provide said conduit for gas between the top of said product stripper section and the bottom of said absorption section.

13. An apparatus for separating normally liquid constituents from a gaseous mixture thereof which comprises a vertical cylindrical column, a pair of spaced lateral divider plates within said column forming an upper primary stripper section, an intermediate absorption section, and a lower liquid product stripper section, spaced bubble trays within each of said sections, a vertical selective adsorption column provided at successively lower levels therein with a tubular cooling section, an adsorption section, a rectification section and a tubular desorption section, conduit means for conveying adsorbent removed from said desorption section to said tubular cooling section, an inlet conduit for said gaseous mixture into the bottom of said absorption section, a conduit for unabsorbed gas connecting the top of said absorption section with the bottom of said primary stripper section, a conduit for gas connecting the top of said primary stripper section to said inlet conduit for said gaseous mixture, a conduit for liquid connecting the bottom of said absorption section to the top of said primary stripper section, a conduit for liquid connecting the bottom of said primary stripper section with the top of said absorption section, a conduit for liquid connecting the bottom of said absorption section with the top of said product stripper section, an outlet conduit for liquid product from the bottom of said product stripper section, a conduit for gas connecting the top of said absorption section with the bottom of said adsorption section in said selective adsorption column, an outlet conduit for unadsorbed gas from the top of said adsorption section, a conduit for gas connecting the top of said adsorption section with the bottom of said liquid product stripper section, and an outlet conduit from said desorption section for desorbed gases.

14. An apparatus for separating normally liquid constituents from a gaseous mixture thereof which comprises a vertical contacting column, a pair of spaced lateral divider plates within said column forming an upper primary stripper section, an intermediate absorption section, and a lower liquid product stripper section, spaced bubble trays within each of said sections, an inlet conduit for said gaseous mixture into the bottom of said absorption section, a conduit for unabsorbed gas connecting the top of said absorption section with the bottom of said primary stripper section, a conduit for gas connecting the top of said primary stripper section to said inlet conduit for said gaseous mixture, a conduit for liquid connecting the bottom of said absorption section to the top of said primary stripper section, a conduit for liquid connecting the bottom of said primary stripper section with the top of said absorption section, a conduit for liquid connecting the bottom of said absorption section with the top of said product stripper section, an outlet conduit for liquid product from the bottom of said product stripper section, an outlet conduit for gas from the top of said absorption section, and an inlet conduit for gas into the bottom of said liquid product stripper section.

15. An apparatus for separating normally liquid constituents from a gaseous mixture thereof which comprises a vertical contacting column, a pair of spaced lateral divider plates within said column forming an upper primary stripper section, an intermediate absorption section, and a lower liquid product stripper section, spaced bubble trays within each of said sections, an inlet conduit for said gaseous mixture into the bottom of said absorption section, a conduit for unabsorbed gas connecting the top of said absorption section with the bottom of said primary stripper section, indirect heating means associated with said last-named conduit, a conduit for gas connecting the top of said primary stripper section to said inlet conduit for said gaseous mixture, indirect cooling means in said last-named conduit, a conduit for liquid connecting the bottom of said absorption section to the top of said primary stripper section, indirect heating means in said last-named conduit, a conduit for liquid connecting the bottom of said primary stripper section with the top of said absorption section, indirect cooling means in said last-named conduit, a conduit for liquid connecting the bottom of said absorption section with the top of said product stripper section, indirect heating means in said last-named conduit, an outlet conduit for liquid product from the bottom of said product stripper section, indirect cooling means in said outlet conduit for liquid product, an outlet conduit for gas from the top of absorption section, and an inlet conduit for gas into the bottom of said product stripper section.

16. An apparatus for separating normally liquid constituents from a gaseous mixture thereof which comprises a vertical contacting column, a pair of spaced lateral divider plates within said column forming an upper primary stripper section, an intermediate absorption section, and a lower liquid product stripper section, spaced bubble trays within each of said sections, a vertical selective adsorption column provided at successively lower levels therein with a tubular cooling section, an adsorption section, a rectification section and a tubular desorption section, conduit means for conveying adsorbent removed from said desorption section to said tubular cooling section, an inlet conduit for said gaseous mixture into the bottom of said intermediate absorption section, a conduit for unabsorbed gas connecting the top of said absorption section through an indirect heating means with the bottom of said primary stripper section, a conduit for gas connecting the top of said primary stripper section through an indirect cooling means to said inlet conduit for said gaseous mixture, a conduit for liquid connecting the bottom of said absorption section through an indirect heating means to the top of said primary stripper section, a conduit for liquid connecting the bottom of said primary stripper section through an indirect cooling means with the top of said absorption section, a conduit for liquid connecting the bottom of said absorption section through an indirect heating means with the top of said product stripper section, an outlet conduit for liquid product from the bottom of said product stripper section through an indirect cooling means, a conduit for gas connecting the top of said absorption section with the bottom of said absorption section in said selective adsorption column, an outlet conduit for unadsorbed gas from the top of said adsorption section communicating with the bottom of said liquid product stripper section, and an outlet conduit from said desorption section for desorbed gases.

17. An apparatus for separating normally liquid constituents from a gaseous mixture thereof which comprises a primary stripper chamber, an absorption chamber and a liquid product stripper chamber, spaced bubble trays within each of said chambers, an inlet conduit for said gaseous mixture into the bottom of said absorption chamber, a conduit for unabsorbed gas connecting the top of said absorption chamber with the bottom of said primary stripper chamber, a conduit for gas connecting the top of said primary stripper chamber to said inlet conduit for said gaseous mixture into said absorption chamber, a conduit for liquid connecting the bottom of said absorption chamber to the top of said primary stripper chamber, a conduit for liquid connecting the bottom of said primary stripper chamber to the top of said absorption chamber, a conduit for liquid connecting the bottom of said absorption chamber with the top of said product stripper chamber, a conduit for gas connecting the top of said product stripper chamber with the bottom of said absorption chamber, an outlet conduit for liquid product from the bottom of said product stripper chamber, an outlet conduit for gas from the top of said absorption chamber and an inlet conduit for stripping gas into the bottom of said liquid product stripper chamber.

18. An apparatus for separating normally liquid constituents from a gaseous mixture thereof which comprises a primary stripper chamber, an absorption chamber, and a liquid product stripper chamber, spaced bubble trays within each of said chambers, a vertical selective adsorption column provided at successively lower levels therein with a tubular cooling section, an adsorption section, a rectification section and a tubular desorption section, conduit means for conveying adsorbent removed from said desorption section to said tubular cooling section, an inlet conduit for said gaseous mixture into the bottom of said adsorption chamber, a conduit for unabsorbed gas connecting the top of said absorption chamber with the bottom of said primary stripper chamber, a conduit for gas connecting the top of said primary stripper chamber to said inlet conduit for said gaseous mixture, a conduit for liquid connecting the bottom of said absorption chamber to the top of said primary stripper chamber, a conduit for liquid connecting the bottom of said primary stripper chamber with the top of said absorption chamber, a conduit for liquid connecting the bottom of said absorption chamber with the top of said product stripper chamber, a conduit for gas connecting the top of said product stripper section with the bottom of said absorption section, an outlet conduit for liquid product from the bottom of said product stripper chamber, a conduit for gas connecting the top of said absorption chamber with the bottom of said adsorption section in said selective adsorption column, an outlet conduit for unadsorbed gas from the top of said adsorption section connecting said adsorption section with the bottom of said liquid product stripper chamber, and an outlet conduit from said desorption section for desorbed gases.

19. An apparatus for separating normally liquid constituents from a gaseous mixture thereof which comprises a primary stripper chamber, an absorption chamber and a liquid product stripper chamber, spaced bubble trays within each of said chambers, a vertical selective adsorption column provided at successively lower levels therein with a tubular cooling section, an adsorption section, a rectification section and a tubular desorption section, conduit means for conveying adsorbent removed from said desorption section to said tubular cooling section, an inlet conduit for said gaseous mixture into the bottom of said absorption chamber, a conduit for unabsorbed gas connecting the top of said absorption chamber through indirect heating means with the bottom of said primary stripper chamber, a conduit for gas connecting the top of said primary stripper chamber through indirect cooling means with said inlet conduit for said gaseous mixture, a conduit for liquid communicating the bottom of said absorption chamber through indirect heating means with the top of said primary stripper chamber, a conduit for liquid connecting the bottom of said primary stripper chamber through indirect cooling means with the top of said absorption chamber, a conduit for liquid connecting the bottom of said absorption chamber through indirect heating means with the top of said product stripper chamber, a conduit for gas connecting the top of said product stripper section with the bottom of said absorption section, an outlet conduit for liquid product from the bottom of said product stripper chamber provided with indirect cooling means, a conduit for gas connecting the top of said absorption chamber with the bottom of said adsorption section in said selective adsorption column, a conduit for gas connecting the top of said adsorption section with the bottom of said liquid product stripper chamber and an outlet conduit from said desorption section for desorbed gases.

20. An apparatus for separating normally liquid constituents from a gaseous mixture thereof which comprises a primary stripper chamber, an absorption chamber and a liquid product stripper chamber, spaced bubble trays within each of said chambers, an inlet conduit for said gaseous mixture into the bottom of said absorption chamber, a conduit for unabsorbed gas connecting the top of said absorption chamber through indirect heating means with the bottom of said primary stripper chamber, a conduit for gas connecting the top of said primary stripper chamber through indirect cooling means with said inlet conduit for said gaseous mixture, a conduit for liquid communicating the bottom of said absorption chamber through indirect heating means with the top of said primary stripper chamber, a conduit for liquid connecting the bottom of said primary stripper chamber through indirect cooling means with the top of said absorption chamber, a conduit for liquid connecting the bottom of said absorption chamber through indirect heating means with the top of said product stripper chamber, a conduit for gas connecting the top of said product stripper section with the bottom of said absorption section, an outlet conduit for liquid product from the bottom of said product stripper chamber provided with indirect cooling means, a conduit for gas from the top of said absorption chamber, and a conduit for gas into the bottom of said liquid product stripper chamber.

CLYDE H. O. BERG.

REFERENCES CITED

The following references are of record in the file of this patent:

UNITED STATES PATENTS

| Number | Name | Date |
|---|---|---|
| 1,422,007 | Soddy | July 4, 1922 |
| 2,038,314 | Ragatz | Apr. 21, 1936 |
| 2,074,644 | Drennan | Mar. 23, 1937 |
| 2,117,548 | Drennan | May 17, 1938 |
| 2,134,836 | Ostergaard | Nov. 1, 1938 |
| 2,262,202 | Ragatz et al. | Nov. 11, 1941 |
| 2,290,957 | Hachmuth | July 28, 1942 |
| 2,293,241 | Campbell | Aug. 18, 1942 |
| 2,345,934 | Gregory | Apr. 4, 1944 |
| 2,367,284 | Kaplan | Jan. 16, 1945 |
| 2,468,750 | Gudenrath | May 3, 1949 |

OTHER REFERENCES

Berg et al.: "The Petroleum Engineer" of May, 1947, pages 115, 116 and 118.